(12) United States Patent
Huth et al.

(10) Patent No.: US 11,139,710 B2
(45) Date of Patent: Oct. 5, 2021

(54) WINDING ARRANGEMENT FOR A THREE-PHASE MACHINE

(71) Applicant: ebm-papst Mulfingen GmbH & Co. KG, Mulfingen (DE)

(72) Inventors: Gerhard Huth, Hohenroth-Leutershausen (DE); Jens Krotsch, Niederstetten (DE)

(73) Assignee: ebm-papst Mulfingen GmbH & Co. KG, Mulfingen (DE)

(*) Notice: Subject to any disclaimer, the term of this patent is extended or adjusted under 35 U.S.C. 154(b) by 152 days.

(21) Appl. No.: 16/683,537

(22) Filed: Nov. 14, 2019

(65) Prior Publication Data
US 2020/0083770 A1   Mar. 12, 2020

Related U.S. Application Data

(63) Continuation of application No. PCT/EP2018/064694, filed on Jun. 5, 2018.

(30) Foreign Application Priority Data

Jun. 12, 2017 (DE) ............ 10 2017 112 837.9

(51) Int. Cl.
*H02K 3/28* (2006.01)
*H02K 1/16* (2006.01)

(52) U.S. Cl.
CPC ............ *H02K 3/28* (2013.01); *H02K 1/16* (2013.01)

(58) Field of Classification Search
CPC .................. H02K 3/28; H02K 1/16
See application file for complete search history.

(56) References Cited

U.S. PATENT DOCUMENTS

| 1,723,912 A * | 8/1929 | Bergman | H02K 1/16 310/176 |
| 2,242,800 A * | 5/1941 | Olson | H02K 3/28 307/155 |
| 3,324,322 A * | 6/1967 | Johns | H02K 3/28 310/198 |

(Continued)

FOREIGN PATENT DOCUMENTS

| DE | 10 2004 058 045 A1 | 6/2006 |
| DE | 10 2015 118 576 A1 | 5/2017 |
| WO | WO-2008/044019 A2 | 4/2008 |

OTHER PUBLICATIONS

International Search Report dated Sep. 13, 2018 in corresponding PCT/EP2018/064694.

*Primary Examiner* — Robert W Horn
(74) *Attorney, Agent, or Firm* — Harness, Dickey & Pierce, P.L.C.

(57) ABSTRACT

A three-phase machine with a 2-pole stator (10) formed with a winding arrangement of a double-layer tooth-wound coil winding has m winding phases (U, V, W). The winding arrangement has at least one first double-layer tooth-wound coil (20) and one second double-layer tooth-wound coil (30). Each tooth-wound coil occupies a half of each of four respective adjacent slots (N) of the stator (10) with a winding phase (W). Each double-layer tooth-wound coil (20, 30) forms two concentrically arranged coils. The second double-layer tooth-wound coil (30) is arranged such that it is shifted by a pole pitch with respect to the first double-layer tooth-wound coil (20).

11 Claims, 2 Drawing Sheets

(56) References Cited

U.S. PATENT DOCUMENTS

| | | | | |
|---|---|---|---|---|
| 3,325,661 A * | 6/1967 | Parsons | H02K 3/28 | 310/179 |
| 3,470,409 A * | 9/1969 | Scheda | H02K 3/28 | 310/180 |
| 3,619,730 A * | 11/1971 | Broadway | H02K 17/06 | 318/776 |
| 3,780,324 A * | 12/1973 | Greenwell | H02K 3/28 | 310/180 |
| 5,898,251 A * | 4/1999 | Mochizuki | H02K 3/28 | 310/179 |
| 6,570,290 B2 * | 5/2003 | Kazmierczak | H02K 3/12 | 29/596 |
| 7,005,772 B1 * | 2/2006 | Frederick | H02K 3/28 | 310/179 |
| 7,268,455 B2 * | 9/2007 | Kouda | H02K 3/12 | 29/596 |
| 7,830,060 B2 * | 11/2010 | Miyata | H02K 3/28 | 310/180 |
| 8,018,113 B2 * | 9/2011 | Tang | H02K 3/28 | 310/198 |
| 8,461,739 B2 * | 6/2013 | Liang | H02K 1/165 | 310/193 |
| 8,531,078 B2 * | 9/2013 | Bangura | H02K 3/12 | 310/208 |
| 9,954,406 B2 * | 4/2018 | Ito | H02K 15/045 | |
| 2012/0001512 A1 | 1/2012 | Dajaku | | |
| 2012/0228981 A1 | 9/2012 | Dajaku | | |
| 2013/0015742 A1 * | 1/2013 | Inoue | H02K 3/28 | 310/208 |
| 2014/0035425 A1 | 2/2014 | Dajaku | | |
| 2018/0198353 A1 * | 7/2018 | Kuroyanagi | H02K 3/28 | |
| 2018/0337566 A1 * | 11/2018 | Lan | H02K 1/165 | |
| 2018/0351427 A1 * | 12/2018 | Kuroyanagi | H02K 23/30 | |
| 2019/0319520 A1 * | 10/2019 | Bailey | H02K 3/18 | |
| 2020/0083770 A1 * | 3/2020 | Huth | H02K 1/16 | |
| 2020/0328635 A1 * | 10/2020 | Huth | H02K 3/28 | |
| 2021/0104929 A1 * | 4/2021 | Huth | H02K 3/18 | |

* cited by examiner

WINDING ARRANGEMENT FOR A THREE-PHASE MACHINE

CROSS-REFERENCE TO RELATED APPLICATIONS

This application is a continuation of International Application No. PCT/EP2018/064694, filed Jun. 5, 2018, which claims priority to German Application No. 10 2017 112 837.9, filed Jun. 12, 2017. The disclosures of the above applications are incorporating herein by reference.

FIELD

The disclosure relates to a winding arrangement for a three-phase machine as well as to a three-phase machine with such a winding arrangement.

BACKGROUND

Inverter-fed permanent magnet synchronous machines (PM synchronous machines) are used in a multitude of technical applications. For cost reasons, PM synchronous machines increasingly are designed with so-called tooth-wound coil windings. The tooth-wound coil technology simplifies the stator design of a PM synchronous machine. Furthermore, it makes it possible to design the stator in segments. Thus, the stator can be manufactured by the module in a kind of building block concept. The disadvantage of tooth-wound coil windings is that they form a wide air gap field spectrum. The spectrum can be more or less detrimental depending on the motor design.

Various winding concepts already are known in the prior art. The object underlying publication US 20120228981 A1 is to reduce the subharmonics relative to the working harmonic. It proposes a multi-layer winding solution. It includes at least two sides of coils per slot. The number of turns of the sides of the coils in a first slot are different from the number of turns of the sides of the coils in a second slot. Thus, the coils are de-signed as tooth-wound coils.

U.S. Patent Publication No. 20120001512 A1 proposes a stator with a number of slots that is double the number of slots in the prior art. Here, each coil surrounds two respective teeth. The coils are characterized by different numbers of windings while the width of the coils remains identical.

U.S. Patent Publication No. 20140035425 A1 also deals with the reduction of un-wanted harmonics via a winding that can be produced at low cost. It proposes a multi-layer tooth-wound coil winding. The individual coils of a phase have different numbers of turns. The teeth hold different numbers of tooth-wound coils. This coil topology also is not expedient for small numbers of poles.

So-called AC line start motors require a line start functionality. The wide air gap field spectrum of tooth-wound coil windings has a detrimental effect. The resulting rotational force of the higher harmonic waves interferes with or even prevents the start-up of the line start motors. Squirrel cage motor and PM line start motors therefore cannot successfully be executed using the tooth-wound coil windings known in the prior art. By contrast, small PM synchronous motors, for example, that are operated in a field-controlled manner at the inverter and that are increasingly used in high-engine-speed drives, generally can be executed using tooth-wound coil technology.

Another essential problem is the use of tooth-wound coil windings with low numbers of poles. As tooth-wound coil windings inherently gravitate toward higher numbers of pole pairs, PM synchronous motors with low numbers of poles (e.g., 2-pole or 4-pole designs) can only be realized in a very limited fashion when using the known tooth-wound coil windings.

SUMMARY

It is therefore the object of the present disclosure to overcome the aforementioned disadvantages and to propose a winding topology with the characteristics of a tooth-wound coil winding with a short winding head. The winding can be implemented efficiently even at low numbers of poles (2-pole and 4-pole designs). Furthermore, the winding has a favorable winding field spectrum. A demand therefore exists for a winding system that can be produced simply and at low cost. The fundamental field has the highest possible winding factor of a low order or low number of poles while having the lowest possible winding factor for the higher harmonics of the windings.

This object is achieved by the combination of characteristics according to a three-phase machine having a 2-pole stator formed with a winding arrangement in a tooth-wound coil design comprising $m$ winding phases (U, V, W). The winding arrangement includes at least one first double-layer tooth-wound coil and one second double-layer tooth-wound coil. Each tooth-wound coils partially occupies four respective adjacent slots of the stator with a winding phase (W). Each double-layer tooth-wound coil forms a pair of two concentrically arranged coils. The second double-layer tooth-wound coil is arranged such that it is shifted by a pole pitch with respect to the first double-layer tooth-wound coil.

One basic idea of the present disclosure is to use a double-layer tooth-wound coil winding and to provide a specific winding scheme. The basic element and thereby the interchangeable component of this double-layer tooth-wound coil winding is a double-layer tooth-wound coil. It occupies a half of each of a defined number of, preferably four, adjacent slots of the stator. This means that the number of adjacent slots are occupied by a winding phase either in their upper or lower layers. The double-layer tooth-wound coil therefore includes two concentrically arranged coils of a winding phase. Specifically, an inner coil and an outer coil are wound around the teeth that were used for the inner coil.

The two concentrically arranged coils wound from one winding phase form a pair of coils. Thus, the windings of the outer coil of the pair of coils are located above the windings of the inner coil of the pair of coils in the area of the winding head.

Thus, the disclosure proposes a winding arrangement for a three-phase machine as well as a three-phase machine with a 2-pole stator having such a winding arrangement. p identifies the number of pairs of poles and 2p the number of poles. This winding arrangement is formed by a double-layer tooth-wound coil winding comprising m winding phases U, V, W. The winding arrangement includes at least one first double-layer tooth-wound coil and at least one second double-layer tooth-wound coil. Each of the tooth-wound coils occupies a half of each of a number (preferably four) of adjacent slots of the stator with a winding phase. Each double-layer tooth-wound coil forms two concentrically arranged coils. The second double-layer tooth-wound coil is arranged such that it is shifted in the rotational direction by a pole pitch, with respect to the first double-layer tooth-wound coil.

Furthermore, the respective double-layer tooth-wound coils, that are wound with a first winding phase in the lower layer, are wound with at least one second phase. The second phase differs from the first, in their upper layers, preferably with a section of the coil of a second phase and of a third phase differing from the former.

According to the disclosure, it provides that the respectively adjacent slots of the stator, a half of which is wound with a winding phase, are wound either in the upper or the lower layer of this double-layer tooth-wound coil.

In a further advantageous design of the disclosure, the direction of the current in the winding phase of the two coils of the first double-layer tooth-wound coil is opposite to the direction of the current in this winding phase of the two coils of the second double-layer tooth-wound coil, which is shifted by a pole pitch.

The sequence of the pairs of coils of the winding phases U, V, W wound adjacent to each other in the lower layer is identical to that of the pairs of coils wound in the upper layer. Thus, they are arranged offset to each other in the circumferential direction and respective identical phases are wound in opposite directions of the current.

In another preferred design of the disclosure, a third and, if applicable, fourth double-layer tooth-wound coil is/are arranged between a pair of coils of a respective first double-layer tooth-wound coil and a pair of coils of a second double-layer tooth-wound coil of a winding phase. The third and fourth double-layer tooth-wound coils occupy two respective slots.

Advantageously, the coils of the m winding phases in the upper and lower layer are arranged offset to each other by the angle $2\pi/m$ p if m is an odd number,
$\pi/m$ p if m is an even number,
wherein p is the number of pole pairs.

In a further advantageous design, the coils of one of the m winding phases in the upper layer are shifted by two pitches respective to the coils of the same winding phase in the lower layer.

Furthermore, advantageously the sequence of the winding phases U, V, W in the rotational direction of the stator is identical in the upper and lower layer. The direction of the current in the respective coils of the winding phases is opposite in the coil pairs of the lower layer respective to those in the upper layer.

The number of windings in a coil phase of the inner coil of a pair of coil of a double-layer tooth-wound coil, preferably, is selected to be lower than the number of windings of this coil phase in the outer coil of the pair of coils in the area of this double-layer tooth-wound coil.

The disclosure can be realized particularly advantageously in permanent magnet synchronous machines with a 2-pole or 4-pole stator. It is more advantageous with three winding phases.

Other advantageous further developments of the disclosure are characterized in the dependent claims or are explained in more detail below with reference to the figures and together with a preferred embodiment of the disclosure.

DRAWINGS

The drawings described herein are for illustrative purposes only of selected embodiments and not all possible implementations, and are not intended to limit the scope of the present disclosure.

FIG. 4 is a zone map of a 2-pole double-layer tooth-wound coil winding with the number of phases m=3.

FIG. 5 is a zone map of a 4-pole double-layer tooth-wound coil winding with the number of phases m=3.

FIG. 6 is a slot allocation of a double-layer tooth-wound coil with an inner and an outer coil with respectively different number of windings.

DETAILED DESCRIPTION

Figure 1:
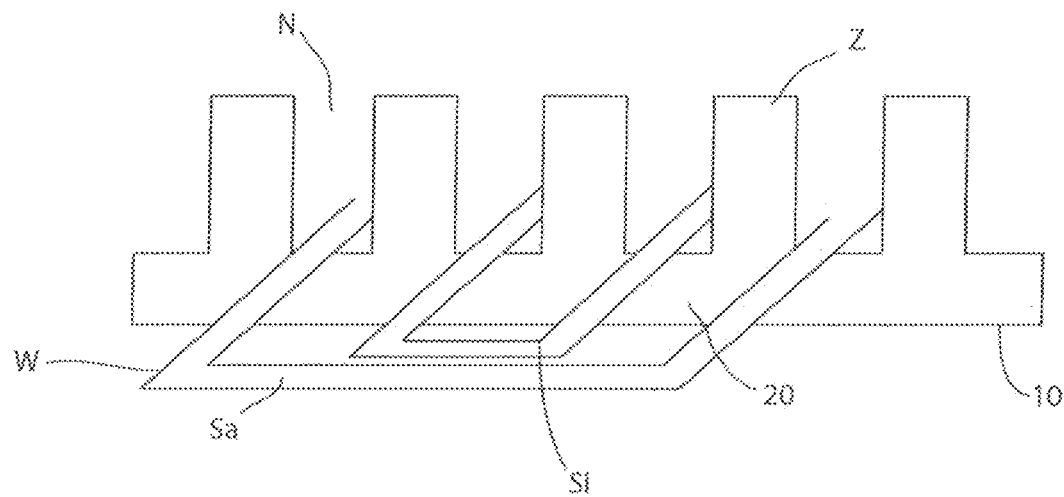
FIG. 1 is a schematic view of a slot allocation of a double-layer tooth-wound coil with an inner and an outer coil.

The disclosure is described in more detail in the following with reference to FIGS. 1 to 6. Identical reference numbers indicate identical structural or functional characteristics. FIG. 1 illustrates a slot allocation of a schematically shown double-layer tooth-wound coil 20 of a stator 10 with teeth Z and having inner and outer coils Si and Sa. The inner and outer coils Si and Sa are wound from one winding phase W. The number of windings can be identical or different.

Figure 2:
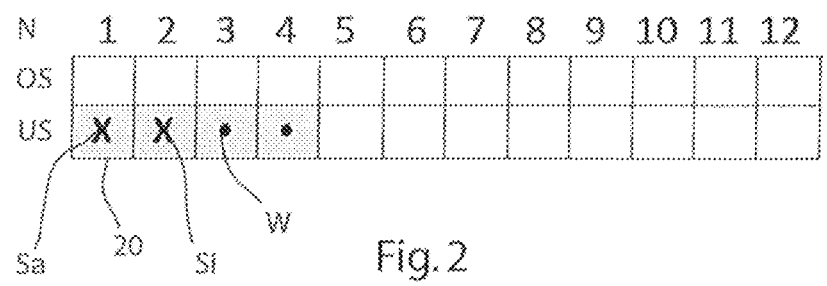
FIG. 2 is a sectional view of a zone map of a double-layer tooth-wound coil.

FIG. 2 illustrates the double-layer tooth-wound coil winding shown in FIG. 1. Here, it is shown as a sectional view of a zone map. The lower layer US here is occupied by the inner and the outer coil. Furthermore, it shows the direction of winding and, respectively, the present direction of the current. The direction of the current is one moving from the viewer into the drawing in slots 1 and 2 and moving out of the drawing toward the viewer in slots 3 and 4.

A 2-pole rotational field stator with such a double-layer tooth-wound coil winding for the number of winding phases m=3 thus comprises m×4=3×4=12 slots. This is shown in the zone maps in FIGS. 2-4 and FIG. 6.

Figure 3:
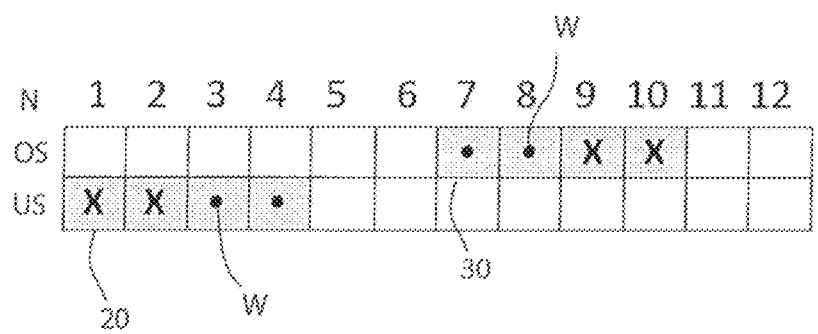
FIG. 3 is a phase zone map of a 2-pole double-layer tooth-wound coil winding.

FIG. 3 shows a phase zone map of a 2-pole double-layer tooth-wound coil winding. The winding of a winding phase W is in a lower layer US and an upper layer OS. According to this exemplary embodiment, the two double-layer tooth-wound coils 20, 30 of this phase W are shifted against each other by exactly one pole pitch in the case of a 2-pole coil, by 6 pitches. They are provided with currents of exactly opposite polarity. The present direction of the current again can be found in the zone map.

Figures 4, 5, 6:
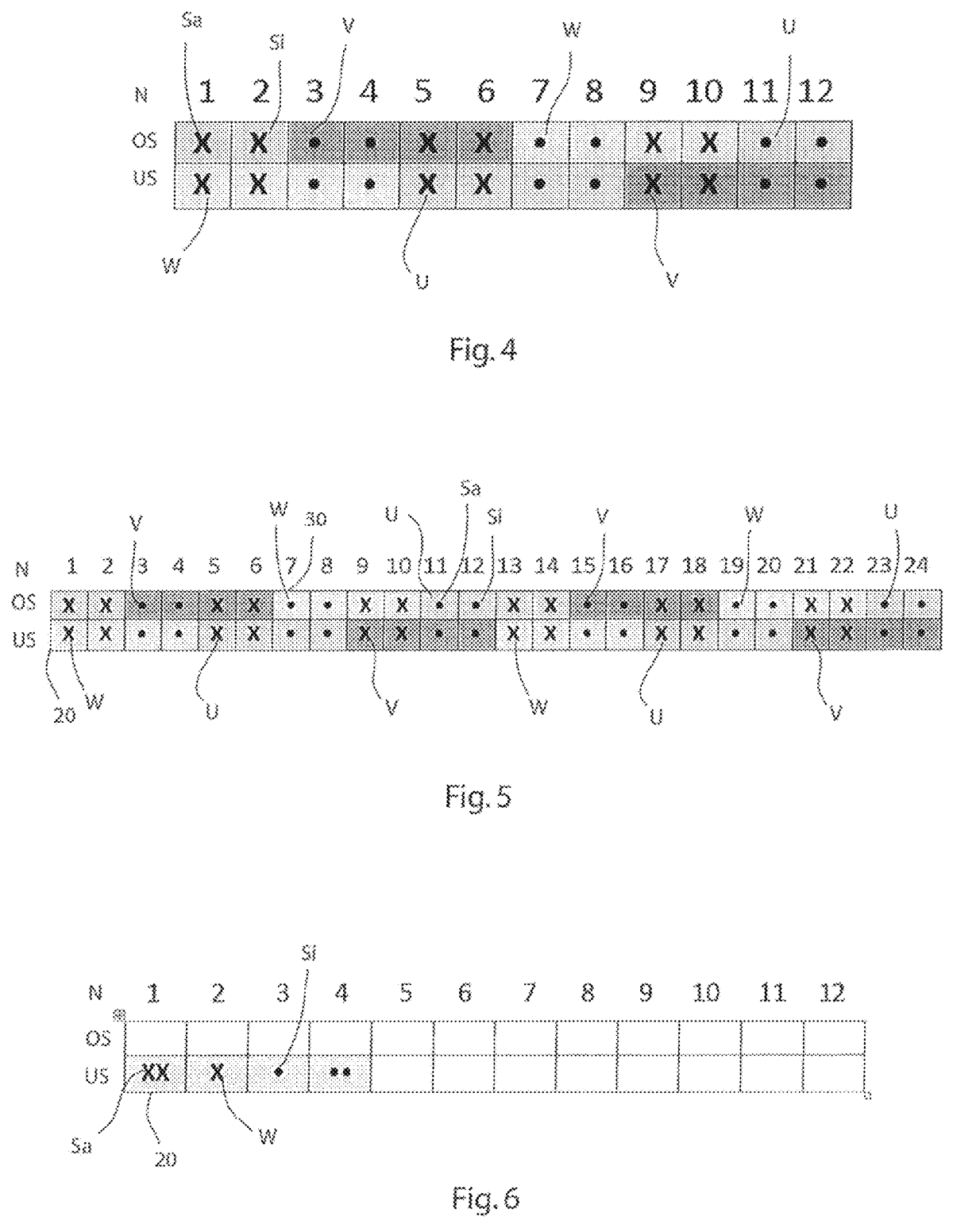

FIG. 4 shows a zone map of a 2-pole double-layer tooth-wound coil winding of the number of phases m=3. The three winding phases are U, V, W. The different winding phases are indicated by different shading. Each winding phase U, V, W includes two double-layer tooth-wound coils. One is located in the lower layer US and one in the upper layer OS, respectively. According to this exemplary embodiment, the two double-layer tooth-wound coils of each winding phase U, V, W are shifted against each other by exactly one pole pitch and are provided with currents of exactly opposite polarity.

In other words, this means that the direction of the current of the two coils of the first double-layer tooth-wound coil in the area of the first and second slot of the winding phase US is identical to the direction of the current of the two coils of the second double-layer tooth-wound coil in the area of the ninth and tenth slot. The direction of the current in the other winding sections, that is, in the area of the third and fourth slot of the first double-layer tooth-wound coil and in the area of the seventh and eighth slot of the second double-layer tooth-wound coil is exactly opposite.

FIG. 5 shows a zone map of an exemplary embodiment of a 4-pole double-layer tooth-wound coil winding with the number of phases m=3 with 24 slots. The basic arrangement and sequence of the pairs of coils of the double-layer tooth-wound coils 20, 30 is executed as described previously.

The sequence of the winding phases U, V, W is the same in the direction of rotation of the stator 10 in the bottom layer US and the top layer OS. The direction of the current is reversed in the respective coils Si, Sa.

FIG. 6 shows an exemplary embodiment with a slot allocation of a double-layer tooth-wound coil 20 with inner and outer coils Si, Sa with different numbers of windings, respectively. The outer coil Sa of the double-layer tooth-wound coil 20 has a higher number of windings compared to the inner coil Si.

The 3-phase double-layer tooth-wound winding with the number of poles p excites an air gap field spectrum of the order of v/p=1+6×g, with g=0, ±1, ±2, ±3, ±4, . . . and, if the slot opening is neglected, has a number of different winding factors $|\xi_\nu|$ with an absolute value of exactly 2. The winding factors repeating cyclically, as shown in the following Table 1.

TABLE 1

| v/p | $|\xi_\nu|$ |
|---|---|
| ... | ... |
| 13 | 0.483 |
| 7 | 0.129 |
| 1 | 0.483 |
| −5 | 0.129 |
| −11 | 0.483 |
| ... | ... |

Thus, the double-layer tooth-wound coil winding approximately has the fundamental field saturation of the tooth-wound coil winding with the number of openings q=1, but has a significantly better selectivity.

Due to the different numbers of windings of the inner and outer coils of a pair of coils of a winding phase, it is possible to increase the amplitude of the fundamental field of the number of pole pairs p. This reduces the amplitudes of the higher fields. If, for example, a ratio of windings in the inner coil to those in the outer coil of 0.733 is selected, the winding factors of the fifth and seventh order can be brought to zero while the fundamental field winding factor increases from 0.483 to 0.517 at the same time. Further reducing the ratio of the number of windings in the inner coil Si to those in the outer coil Sa results in a further increase of the fundamental field winding factor. For example, a ratio of the number of windings of 0.527 results in winding factors for the higher fields of the fifth and seventh order corresponding to the ratio of windings of 1 (see Table 1). However, the fundamental field winding factor can be increased to a value of 0.552. This corresponds to an in-crease of about 15% compared to a design with an identical number of windings.

The embodiments of the disclosure are not limited to the preferred exemplary embodiments listed above. Rather, a number of variants is conceivable, that utilize the solution shown here even in embodiments of fundamentally different types, such that, for example, the number of slots, the number of winding phases m and the number of windings could be adjusted to correspond to particular applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A three-phase machine having a 2-pole stator formed with a winding arrangement in a tooth-wound coil design comprising:
   $m$ winding phases (U, V, W), the winding arrangement includes at least one first double-layer tooth-wound coil and one second double-layer tooth-wound coil, each tooth-wound coils partially occupies four respective adjacent slots of the stator with a winding phase (W), each double-layer tooth-wound coil forms a pair of two concentrically arranged coils, the second double-layer tooth-wound coil is arranged such that it is shifted by a pole pitch with respect to the first double-layer tooth-wound coil.

2. The three-phase machine according to claim 1, wherein the four respective adjacent slots (N) of the stator, that are partially wound with a winding phase (U, V, W), are occupied by a double-layer tooth-wound coil in either the upper layer (OS) or the lower layer (US).

3. The three-phase machine according to claim 1, wherein the direction of the current in the winding phase (U, V, W) of the two coils of the first double-layer tooth-wound coil is opposite to the direction of the current in the winding phase of the two coils in the second double-layer tooth-wound coil.

4. The three-phase machine according to claim 2, wherein the coils of the m winding phases (U, V, W) in the upper layer (OS) and/or the lower layer (US) are shifted against each other respectively by an angle of
   $2\pi/m$ p if m is an odd number,
   $\pi/m$ p if m is an even number.

5. The three-phase machine according to claim 1, wherein third and fourth double-layer tooth-wound coils, respectively, are arranged between the first double-layer tooth-wound coil and the second double-layer tooth-wound coil, wherein the third and fourth coils respectively occupy two slots (N).

6. The three-phase machine according to claim 5, wherein the sequence of the winding phases (U, V, W) is the same in the direction of rotation of the stator in the lower layer (US) and the upper layer (OS), the direction of the current is reversed in the respective coils.

7. The three-phase machine according to claim 1, wherein the number of windings in a coil phase (U, V, W) of the inner coil of a pair of coils of a double-layer tooth-wound coil is lower than the number of windings of the coil phase (U, V, W) in the outer coil of the pair of coils in the area of the double-layer tooth-wound coil.

8. The three-phase machine according to claim 7, wherein the ratio of the number of windings of the inner coil to those of the outer coil of a pair of coils, preferably is smaller than 0.8, and further preferably lies in a range between 0.4 and 0.6.

9. The three-phase machine according to claim 1, wherein the stator is a 2-pole or 4-pole stator.

10. The three-phase machine according to claim 1, wherein the number of phases of the windings is 3.

11. The three-phase machine according to claim 3, wherein the coils of the m winding phases (U, V, W) in the upper layer (OS) and/or the lower layer (US) are shifted against each other respectively by an angle of
    $2\pi/m$ p if m is an odd number,
    $\pi/m$ p if m is an even number.

* * * * *